US005701756A

United States Patent [19]
Ghiraldi

[11] Patent Number: 5,701,756
[45] Date of Patent: Dec. 30, 1997

[54] CONTAINER FOR FAST REFRIGERATION AND PRESERVATION OF MILK

[75] Inventor: Alberto Ghiraldi, Reno di Leggiuno, Italy

[73] Assignee: N.R. Development Limited, Ireland

[21] Appl. No.: 653,470

[22] Filed: May 24, 1996

[30] Foreign Application Priority Data

May 26, 1995 [IT] Italy .................. MI95A1093
Jun. 16, 1995 [IT] Italy .................. MI95A1294

[51] Int. Cl.$^6$ .................. F25D 11/04; B67D 5/62
[52] U.S. Cl. .................. 62/438; 62/393; 62/431
[58] Field of Search .................. 62/237, 430, 431, 62/435, 433, 438, 457.2, 457.9, 439, 352, 393

[56] References Cited

U.S. PATENT DOCUMENTS

| | | | |
|---|---|---|---|
| 2,068,074 | 1/1937 | Rodgers | 62/431 |
| 2,540,649 | 2/1951 | Boylan | 62/237 |
| 2,702,019 | 2/1955 | Duncan | 62/237 |
| 2,703,966 | 3/1955 | Snelson | 62/392 |
| 3,120,110 | 2/1964 | Russell | 62/392 |
| 4,498,312 | 2/1985 | Schlosser | 62/430 |

*Primary Examiner*—William Doerrler
*Attorney, Agent, or Firm*—Shlesinger, Fitzsimmons & Shlesinger

[57] ABSTRACT

A container for fast cooling of milk and its preservation and transportation at an optimal temperature (0°–4° C.) comprises a body (11) consisting of an internal recipient (12) defining a tank (13) for containing the milk and an intermediate shell (14) surrounding the internal recipient (12) and connected in a sealed manner therewith to define between the recipient (12) and the intermediate shell (14) a jacket (18) designed to contain liquid at a freezing temperature lower than a predetermined preservation temperature. The container is covered with an insulating external shell (20). Ducts (30) for circulation of the refrigerating fluid are arranged in the jacket (18). There can also be provided means (48,49,54) for the controlled input of milk up to thermal contact with the refrigerating walls of the recipient (12) and means (35) for mixing the milk in the tank (13) during cooling and preservation.

29 Claims, 3 Drawing Sheets

CONTAINER FOR FAST REFRIGERATION AND PRESERVATION OF MILK

BACKGROUND OF THE INVENTION

The present invention relates to a container for the fast cooling of milk and its preservation at an optimal temperature from the moment of milking and during transportation between the production location and the utilization location, e.g. dairies.

Milk production areas are often located in mountainous locations difficult to reach, far from inhabited centers and without electric power. A typical case is that of sheep, goat, buffalo et cetera stock farms which use pastures located in remote areas not reachable by large automotive vehicles equipped with refrigeration units but which supply the best products.

Preservation of the milk at surrounding temperature from the moment of milking to the beginning of transportation and during travel, sometimes long, from the production area to the dairies involves proliferation of bacteria which is incompatible with the applicable standards covering the quality of food products and in particular milk.

Observation of these standards therefore involves the impossibility of utilizing pasture zones at a great distance from the dairies if the latter are not served by the electric power distribution network or independent electric power generators are not available.

The general purpose of the present invention is to obviate the above mentioned shortcomings by supplying a container for the transportation of milk which would be capable, once carried into the production location, of cooling the milk in the time periods required by standards at a predetermined optimal preservation temperature (between approximately 0° and 4° C.) without being dependent upon local power sources nor on permanently connected independent refrigeration units and transporting it at this temperature, held virtually constant, to the processing places.

Another purpose of the present invention is to provide a container in which the milk could be subjected to a first substantial cooling during its inlet into the container before making contact with the milk already refrigerated and present in the container.

Another purpose of the present invention is to provide a container which would hold the milk at a virtually uniform temperature both during cooling and during preservation thereof.

SUMMARY OF THE INVENTION

In view of the above mentioned purposes it was sought to provide in accordance with the present invention a container for fast cooling of milk and holding it at a predetermined optimal preservation temperature and characterized in that it would comprise a body consisting of an internal recipient defining a tank for containing the milk and an intermediate shell surrounding externally the internal recipient and connected in a sealed manner therewith to define between the recipient and the intermediate shell a jacket designed to contain a liquid with freezing temperature below a predetermined preservation temperature in such a manner as to define the wall of the recipient as a refrigerating wall and in which ducts for the circulation of refrigerating fluid are arranged in the jacket with the container being covered with an external insulating shell.

With respect to ordinary non-refrigerating containers, the container in accordance with the present invention would be capable of extending considerably and with no drop in quality the total period of time elapsing between production of the milk and its delivery to the dairies and thus capable of utilizing for production even pastures located in remote and not readily accessible places while increasing the productivity of the region.

The greatest period of time available for preservation of the milk while observing the qualitative limits placed by health standards also allows making collection with lesser frequency with obvious financial benefits.

In comparison with conventional refrigerating containers which are connected permanently to special refrigerating units, the container in accordance with the present invention offers the advantage of operation in areas without power with no need to transport the refrigerating unit and thus avoid possible damage to the latter because of vibrations and blows typically induced by running over ill- or unpaved roads. This container also offers considerable operating advantages when used in areas where the electric power does not provide certainty of continuous delivery ensuring correct operation of the systems even in case of power failure.

The container in accordance with the present invention also presents the advantage that the temperature of the milk already refrigerated and present in the tank is not significantly influenced by the subsequent input of further quantities of milk having a temperature near that of milking thus ensuring virtually constant temperature of the milk once it has cooled.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
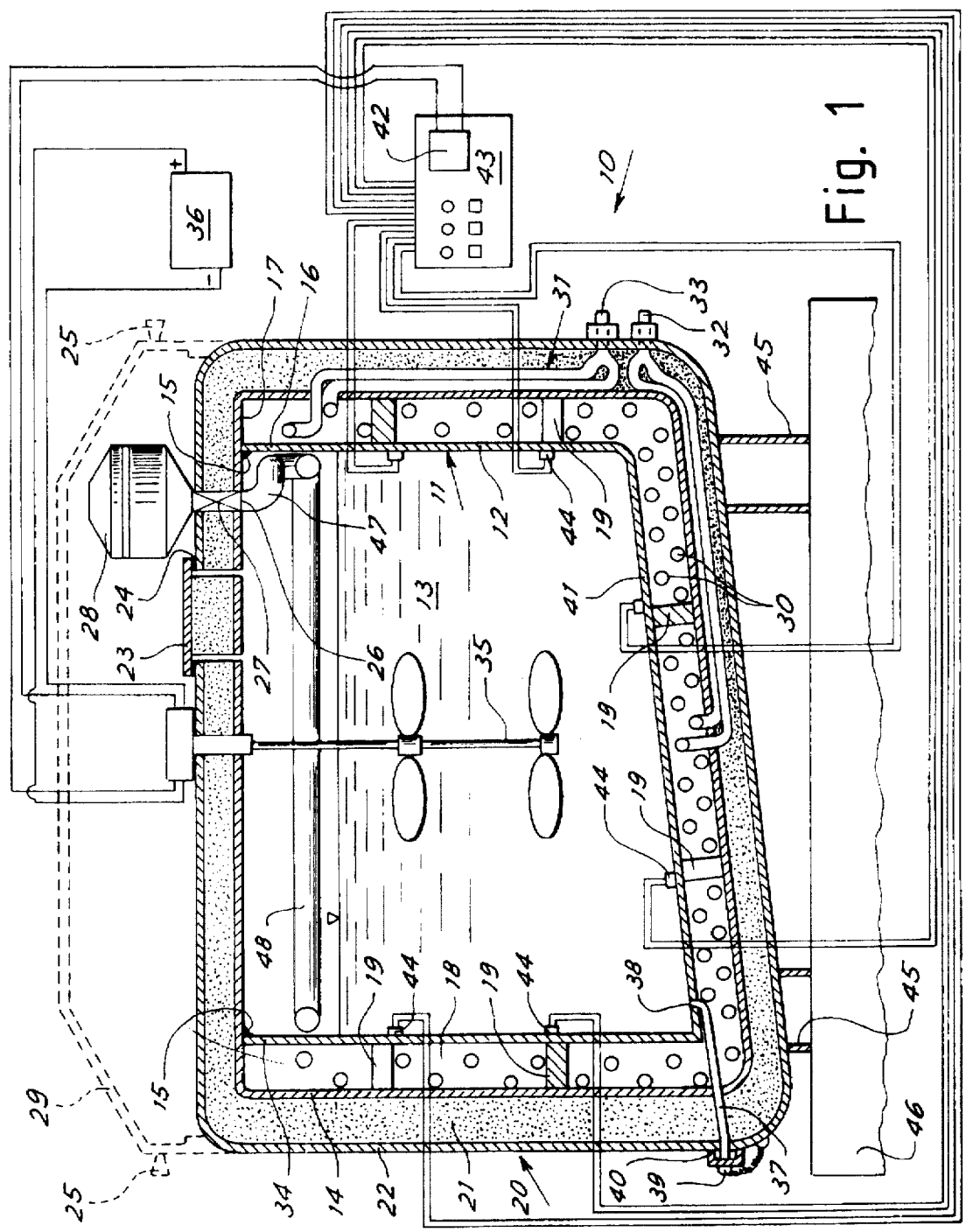
FIG. 1 shows a cross section view of a first embodiment of the container in accordance with the present invention.

In FIG. 1 reference number 10 indicates a milk container comprising a body 11 consisting of an internal recipient 12 defining a tank 13 for containing the milk and an intermediate shell 14 surrounding the recipient 12 externally.

The recipient 12 and the shell 14 can be made for example of stainless steel conforming to the standards on containers for food stuffs and are connected together in a sealed manner advantageously by means of welding 15 opposite their respective upper portions 16, 17. Between the recipient 12 and the shell 14 is defined a tank 18 designed to be filled with a quantity of liquid having a freezing temperature and melting heat such as to allow refrigeration of the milk and holding it at the optimal preservation temperature.

The freezable liquid contained in the tank 18 and taken to the solid state constitutes refrigerating thermal capacity for the milk contained in the container 10.

The optimal milk preservation temperature to avoid proliferation of bacteria incompatible with applicable quality standards for the product is virtually between 0° and 4° C.

and therefore the liquid constituting the thermal capacity can be a solution having a composition such as to display a freezing temperature virtually between −11° C. and 0° C. and melting heat sufficient to ensure refrigeration of the milk starting from a temperature of approximately 35°–37° C. upon milking down to the preservation temperature (0°–4° C.) in a time period between 15' and 3 hours after the end of milking with an input flowrate of the milk into the container equal to approximately 10–40% of its capacity per hour or in approximately 15' after input of the milk into the container depending on the percentage of filling thereof. Conservation of the milk at the temperature of 0°–4° C. is ensured for at least 12 hours and even up to over 72 hours.

Advantageously the solution used will be chosen with a composition such as not to display volumetric expansion upon passage from the liquid to the solid state. But even aqueous solutions of various composition having a minimum expansion upon freezing of less than 5% and preferably less than 2% can also be used.

The tank 18 is sized in such a manner that in case of use of a solution having volumetric expansion upon freezing the quantity of liquid necessary for obtaining the thermal performance required fills its available volume in a quantity not greater than approximately 90–98% while providing a virtual expansion chamber above permitting absorption of the increased volume of the solution resulting from the change of state.

Between the internal recipient 12 and the intermediate shell 14 there can be provided spacing elements 19 for strengthening the structure and made of thermal insulation material to avoid the creation of thermal bridges between the two walls.

The body 11 of the container 10 is covered with an external insulating shell 20 consisting for example of a layer 21 of foamed polyurethane covered by a steel sheet 22 having the same characteristics as those used for the recipient 12 and the shell 14.

In accordance with a preferred embodiment the body 11 of the container is open above to facilitate cleaning operations of the tank 13 and the insulating shell 20 comprises a closing element 23 for the tank. The element 23 is mobile with respect to the container and is insulated and applicable thereon with the interposition of sealing gaskets 24 between them and the body 11 to avoid outflow of milk from the tank during transportation. On the container is provided a mouth 26 which is designed for input of the milk into the tank and is equipped with a filter element 27 which can be placed in communication with a reservoir 28 for metering of the incoming flow of milk. The reservoir 28 has advantageously between ⅕th and ½sth of the capacity of the container 10 and preferably equal to approximately ½₀th thereof and can be applicable to the mouth 26 only during filling operations and thus equipping the mouth with an appropriate filling cap or it can be applied in a permanent manner and in this case it is itself equipped with appropriate closing means.

In the embodiment shown in FIG. 1 the mouth 26 for input of the milk is arranged on the fixed portion of the upper covering of the container. As an alternative, the mouth 26 can also be provided opposite the moving closing element 23 of the tank as shown diagramatically in broken lines in FIG. 2.

Inside the jacket 18 are housed ducts 30 belonging to a coil circuit 31 designed for circulation of refrigerating fluid, e.g. freon gas, designed to take the liquid contained in the jacket to a temperature lower than its freezing temperature.

The circuit 31 can be connected through appropriate quick connections 32, 33 respectively for input and outlet of the refrigerating fluid to an external refrigerating unit of known type (not shown) powered by the electric power system or an electrical power generating unit.

In the jacket 18 can be provided appropriate fins (not shown because their possible configurations are readily imaginable to one skilled in the art) for improvement of the heat exchange and greater cooling speed of the freezable liquid in the jacket so as to speed the cooling of the milk. Appropriate fins can be provided if desired also on the surface of the ducts 30. The presence of these fins involves the creation of a high number of thermal bridges between the cooling ducts and the wall of the recipient 12 in order to utilize the absorption capacity of the heat of all the frozen liquid and not only the surface layer in contact with the wall 12.

Advantageously the circuit 31 consists of two sections connected in parallel and the ducts 30 are arranged inside the jacket 18 with density decreasing from below upward. In addition, the cooling circuit is configured geometrically in such a manner that the path of the refrigerating fluid develops from below so as to provide progressive freezing of the liquid in the jacket from below upward and allow running towards the virtual upper expansion chamber.

For the purpose of avoiding possible overpressure in the jacket 18 due to any expansion of the liquid during freezing, in the top portion of the jacket are provided known valve means, indicated diagramatically by 34, for removal of air from the jacket upon filling thereof with the freezable liquid.

Figure 2:
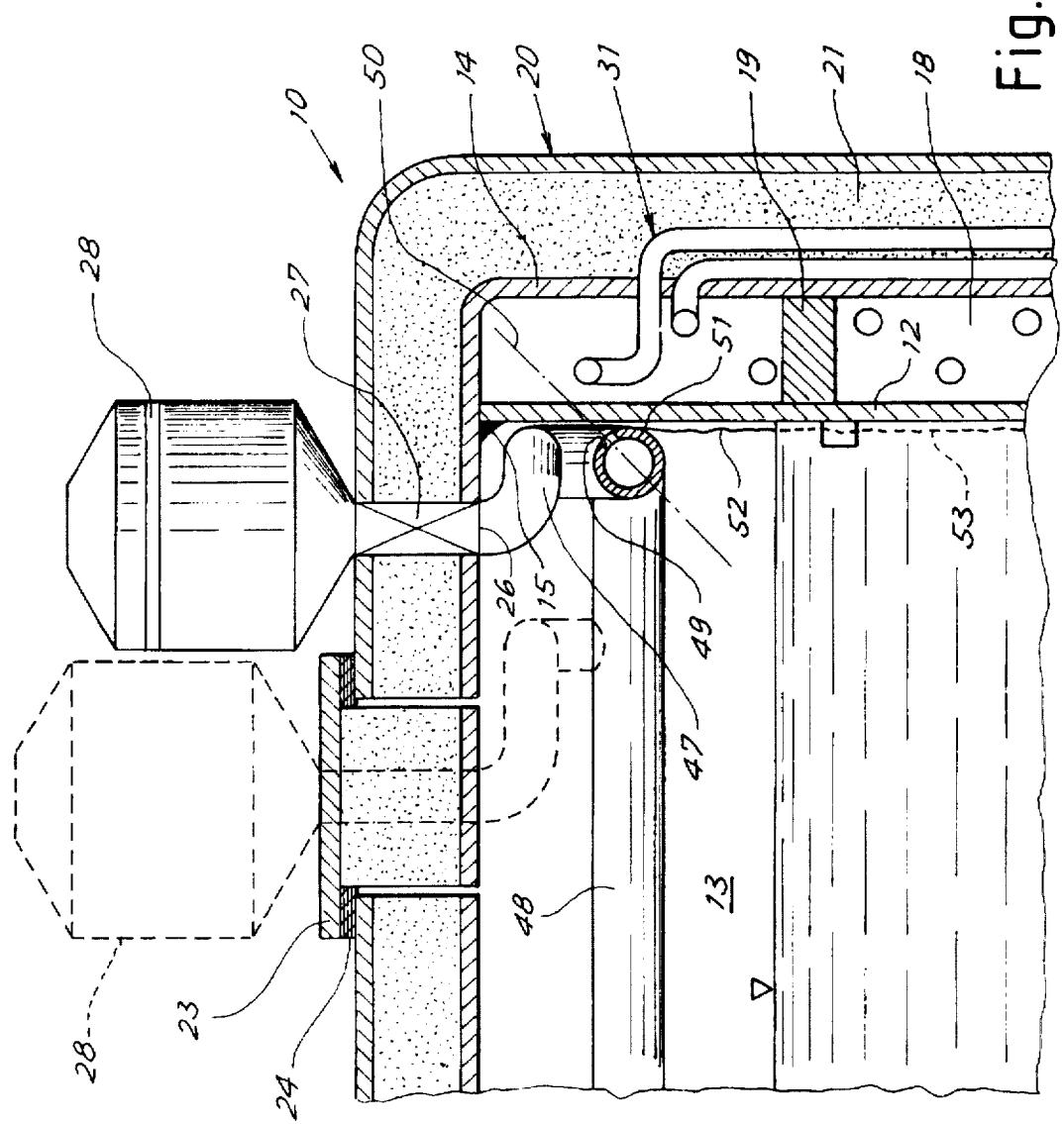
FIG. 2 shows an enlarged detail of the container of FIG. 1 showing the milk input device.

In accordance with another innovative feature of the present invention the container is equipped with a system for controlled input of the milk into the tank, and into thermal contact with the refrigerating wall 12 in the form of a thin film 52 (FIG. 2).

In a first embodiment as shown in FIGS. 1 and 2 the milk input system comprises a connector 47 for connection between the mouth 26 and a duct 48 for milk distribution. The duct 48 develops above the tank 13 virtually along the entire internal periphery of the recipient 12 and is fixed by known support means to the side walls thereof in such a manner that there remains between the duct and the side walls a thin passage sufficient to permit a run-through of the milk along the walls as better explained below.

Along the duct 48 is uniformly distributed a plurality of openings 49 directed as shown in FIG. 2 in such a way as to permit outflow of the milk upwards in the direction of the wall of the recipient 12. The openings 49 have their axis 50 forming with the perpendicular to the side wall of the recipient an angle between 30° and 75° and preferably around 45°.

During the milk loading phase the milk is input to the metering reservoir 28 at a temperature virtually equal to that of milking. Thence it flows through the mouth 26 into the connector 47 and then into the distribution duct In the duct 48 the milk outflows through the opening 49 upwards in the direction of the wall of the internal recipient 12 to then run downward through a thin slot 51 existing between the duct and the side wall to form a liquid film covering the wall. Advantageously the clearance of the slot 51 is sufficiently small to permit generation of a milk film 52 thinner than 2 mm and preferably around 0.2 mm. This slot can be created e.g. by merely drawing the duct near to the wall with provision of fixing means thereto sufficiently spaced from each other. The milk film 52 during its descent along the refrigerated wall of the tank between the duct 48 and the free milk surface of the cold milk already present in the container cools rapidly because of its thinness down to a temperature near that of preservation. Therefore, successive inputs of milk do not cause significant changes in the temperature of the milk input previously and already refrigerated.

The container is also equipped in accordance with the present invention with means of mixing the milk in the tank so as to accelerate cooling and allow it to hold a temperature as uniform as possible both during cooling and during preservation and extending in this manner the preservation phase.

In a preferred embodiment the mixing means consist of a propeller agitator 35 rotating at low speed (on the order of 10 to 50 RPM) immersed in the tank 13 and connected electrically with a power supply battery indicated diagramatically by 36. Advantageously the agitator 35 is arranged in the tank in a virtually central position. The propellers of the agitator 35 are configured in such a manner as to generate a circulation of the milk in the tank characterized by an ascending flow in the central portion of the tank and descending flows near the walls. In this manner the milk film 52 descending along the walls of the tank, after having reached the free surface, is induced to continue the descent along the walls as shown diagramatically by 53 to be further cooled.

Activation of the agitator 35 during the preservation phase can advantageously be automatically controlled by means of a timer 42 or by means of signals sent to a control unit (diagrammed by 42) by appropriate temperature sensors 44 arranged inside the tank 13 when they detect in predetermined portions of the tank temperature differences of the milk with respect to the optimal preservation temperature. In addition, the agitator 35 can be operated in such a manner as to provide continuous mixing during the milk loading and cooling phases and intermittent mixing during preservation at the predetermined temperature.

Figure 3:
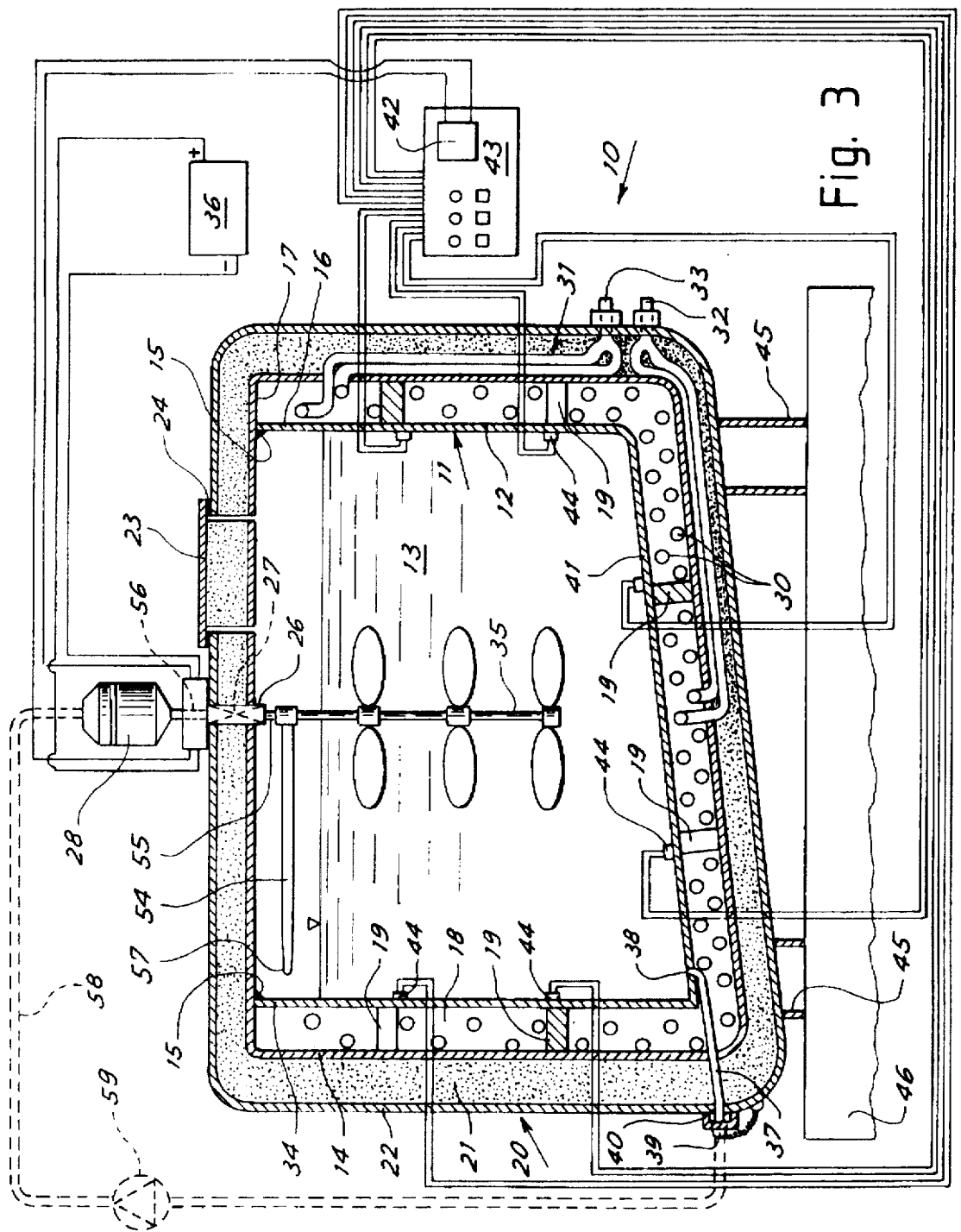
FIG. 3 shows a cross section view of a second embodiment of the container in accordance with the present invention.

In a variant embodiment shown in FIG. 3 the mouth 26 for input of the milk into the tank 13 and the reservoir 28 are arranged in registry with the axis of rotation of the agitator 35.

In this embodiment the controlled milk-input system comprises at least one distribution duct 54 fixed to the agitator shaft to rotate integrally therewith. The duct 54 is directed towards the cooling walls 12 of the tank 13. The portion 55 of the shaft included between the reservoir 28 and the moving duct 54 comprises within it a passage 56 to allow the milk to flow from the tank to the distribution duct. The latter displays at its end 57 appropriate openings for spraying the milk against the cooling wall 12. Once it has made contact with this wall the milk descends along it virtually in the form of a film while cooling rapidly as mentioned above with reference to the first embodiment.

The container comprises in addition a duct 37 for unloading the milk and extending between a first opening 38 for outlet of the milk from the tank 13 and a second opening 39 for its unloading to the exterior and equipped with an insulated closing plug 40.

To facilitate flow of the milk from the container its bottom 41 and the duct 37 are inclined downwards in the direction of the opening 39 at an angle between 5° and 55° and preferably around 10°.

The container in accordance with the present invention can comprises a recirculating circuit 58 equipped with an operating pump 59 as diagrammed in broken lines in FIG. 3. This circuit connects the drain opening 39 with the input mouth 26 and is advantageously usable for washing the container. The circuit 58 is also applicable to the container in accordance with the embodiment of FIG. 1. The container 10 can also be equipped with known means 45 for fixing on a vehicle indicated generically by 46 and which could be e.g a trailer drawn by a tractor.

It is clear that the sizing of the cooling system depends on the thermal performance required and the climatic conditions in which the container will be used. By way of example, for a container operating at an outdoor temperature up to 50° C. and for which is required cooling of the milk in a maximum time period of approximately one hour after the end of milking from the milking temperature (approximately 35°–37° C.) down to the preservation temperature (0°–4° C.) and holding this temperature steady for 12 to 72 hours until delivery of the milk to the processing location, the quantity of freezable liquid contained in the jacket can be equal to 25 to 80% of the maximum quantity of milk contained in the tank 13 and preferably around 60% thereof.

By connecting the cooling circuit of the container with a refrigerating unit before departure from the dairy to bring the freezable liquid to the solid state, the container can be taken to the milk production location where the milk will be inlet to the tank 13 of the container and cooled and held at the preservation temperature until return of the container to the dairy for delivery without the quality characteristics of the milk undergoing undesired changes.

Naturally the above description of an embodiment applying the innovative principles of the present invention is given merely by way of example and therefore is not to be taken as a limitation of the patent right claimed here. For example, for mixing the milk in the tank, in addition to or as an alternative to the helical agitator, there can be used the recirculating circuit 58.

In addition, on the container can be arranged removable means 29 as shown in broken lines in FIG. 1 for shielding the external surface from solar rays. Appropriate handles 25 can be provided on the element 29 to facilitate movement.

What is claimed is:

1. Container for the fast cooling of milk and for holding the milk at a predetermined optimal preservation temperature and comprising a body including an internal recipient wall defining a tank for containing the milk, an intermediate shell surrounding the tank in spaced relation thereto and connected in a sealed manner therewith, thereby to define in the space between the tank and the intermediate shell a jacket containing a liquid having a freezing temperature lower than said predetermined preservation temperature, a plurality of spaced ducts arranged in said jacket and containing a refrigerating fluid for freezing said liquid to a static mass thereby to cause the wall of the tank to function as a cooling wall and the container being covered with an insulating external shell.

2. Container in accordance with claim 1 and characterized in that it comprises means for effecting controlled input of the milk through an input mouth in the upper end of the tank and directly into thermal contact with the cooling wall.

3. Container in accordance with claim 2 and characterized in that the controlled milk input means comprises a distribution duct jointed to said input mouth and extending in confronting relation to and virtually along the entire internal surface of the tank adjacent the upper end of the tank.

4. Container in accordance with claim 3 and characterized in that the distribution duct is equipped with a plurality of openings uniformly distributed for outflow of the milk towards the internal surface of the tank.

5. Container in accordance with claim 4 and characterized in that the openings are directed upward and towards the wall of the tank and each has its axis forming with the surface of said wall an angle between 30° and 75°.

6. Container in accordance with claim 3 and characterized in that between the distribution duct and the wall of the tank there is a passage for allowing run-down of a film of milk along the wall.

7. Container in accordance with claim 2 and characterized in that the means effecting controlled milk-input comprises at least one moving distribution duct jointed to the input mouth and having outlet openings directed towards the tank cooling wall with said at least one duct being rotatable around a vertical axis to allow spraying of the milk through its outlet openings against the cooling wall in the form of a virtual film descending along said wall on the entire internal peripheral surface of the tank.

8. Container in accordance with claim 7 and characterized in that the outlet openings are arranged adjacent an end of the at least one duct located near the cooling wall of the tank.

9. Container in accordance with claim 2 and characterized in that the input mouth is connected to a reservoir operative to meter the flow of inlet milk, and with the reservoir having a capacity between ⅕th and ½₅th of the capacity of the tank.

10. Container in accordance with claim 7 and characterized in that there are provided means of mixing the milk in the tank.

11. Container in accordance with claim 10 and characterized in that the means for mixing the milk in the tank comprises a propeller agitator with rotating shaft immersed in the tank for generation of an ascending flow of milk in the central portion of the tank and descending flows of milk near inner surface of the wall.

12. Container in accordance with claim 11 and characterized in that the at least one moving distribution duct is fixed to the shaft of the agitator to be rotatable integrally therewith.

13. Container in accordance with claim 12 and characterized in that the shaft of the agitator comprises a passage for flow of the milk from the inlet mouth to the at least one moving distribution duct with the mouth being arranged in registry with the axis of rotation of the shaft of the agitator.

14. Container in accordance with claim 1 and characterized in that in the top portion of the jacket is provided valve means for removal of the air from the tank upon its filling with the freezable liquid.

15. Container in accordance with claim 1 and characterized in that the quantity of freezable liquid contained in the jacket is equal to 25 to 80% of the maximum quantity of milk contained in the tank.

16. Container in accordance with claim 1 and characterized in that the freezable liquid has a freezing temperature virtually between −11° C. and 0° C.

17. Container in accordance with claim 1 and characterized in that the spaced ducts for circulation of the cooling fluid form part of a coil circuit arranged in the jacket.

18. Container in accordance with claim 1 and characterized in that the spacing of the ducts are arranged in the jacket with the density of the ducts decreasing from below upwards in such a manner as to cause freezing of the liquid starting from the lower portion of the jacket.

19. Container in accordance with claim 17 and characterized in that the coil circuit consists of two sections in parallel.

20. Container in accordance with claim 17 and characterized in that the circuit for circulation of the cooling fluid is equipped with quick connect means for input of the refrigerating fluid from an external refrigerating unit and with quick connect means for outlet of the fluid towards said unit.

21. Container in accordance with claim 1 and characterized in that between the tank and the intermediate shell are arranged thermally insulating spacing elements.

22. Container in accordance with claim 10 and characterized in that there is provided a battery for supplying power for the means for mixing the milk.

23. Container in accordance with claim 10 and characterized in that the mixing means is operable in such a manner as to provide continuous mixing of the milk during a milk filling and cooling phase, and intermittent mixing during the phase of preservation at the predetermined temperature.

24. Container in accordance with claim 1 and characterized in that the tank has an opening in its upper end and the external insulating shell comprises a tank closing element for said opening which is movable with respect to the opening, and sealing gaskets are provided between the element and the container.

25. Container in accordance with claim 1 and characterized in that in the bottom zone of the tank is arranged an opening for outlet of the milk from the tank outwards along a drain duct with the bottom and the duct being inclined downwards in the drain direction at an angle between 5° and 55°.

26. Container in accordance with claim 25 and including a milk recirculating circuit connecting the drain duct with the input mouth of the tank and with a pump being provided in the recirculating circuit for effecting movement of the circulating milk.

27. Container in accordance with claim 1 and characterized in that there are provided temperature sensors for detection of the milk temperature in predetermined portions of the tank.

28. Container in accordance with claim 1 and characterized in that there are provided removable means for shielding the external surface of the container from the sun's rays.

29. Container in accordance with claim 1 and characterized in that it comprises means for fixing the container upon a vehicle.

* * * * *